United States Patent Office 3,366,575
Patented Jan. 30, 1968

3,366,575
ENHANCEMENT OF OPTICAL BRIGHTENING
EFFECTS BY USING TWO OR MORE SPECIES
OF BRIGHTENING AGENT
Nobujiro Ono, Tokyo, Mitsukuni Sumitani, Soka-shi, and
Seiji Serizawa, Tokyo, Japan, assignors to Nippon
Kayaku Kabushiki Kaisha, Chiyoda-ku, Tokyo, Japan,
a corporation of Japan
No Drawing. Filed Mar. 9, 1965, Ser. No. 438,412
Claims priority, application Japan, Mar. 13, 1964,
39/13,830; Apr. 7, 1964, 39/19,298; June 30, 1964,
39/36,467
6 Claims. (Cl. 252—301.2)

ABSTRACT OF THE DISCLOSURE

This invention concerns an optical brightening agent for polyolefin fibers consisting essentially of a mixture of a substantial brightening amount of each of two to six compounds, different one from the other, said compounds having the general formula:

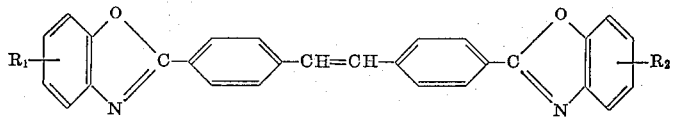

wherein $R_1$ and $R_2$ are each selected from the group consisting of hydrogen atoms and alkyl groups having 1–4 carbon atoms.

---

This invention relates to an optical brightening agent comprising a mixture of compounds represented by the general formula

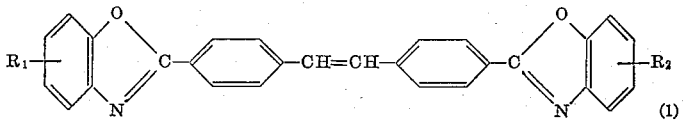
(1)

wherein $R_1$ and $R_2$ are individually one member selected from the group consisting of hydrogen atoms and alkyl groups having 1 to 4 carbon atoms.

When one compound of the above Formula 1 is used independently, no satisfactory result is attainable in the optical brightening treatment of polyolefin fibers. It has now been found, however, that the use of a mixture comprising 2 or more compounds of the Formula 1 gives markedly excellent brightening effects.

Conventionally, there have been few instances where fibers are improved in dyeability by using two fluorescent brightening agents in admixture, as in the present invention, rather than the case where a single fluorescent brightening agent is used. Moreover, in the brightening treatment of polyolefin fibers, no such instances as cited above have been known at all. It should therefore be said that the present invention is quite valuable.

In order to obtain the mixture of compounds of the Formula 1 which is to be used in the present invention, 2 or more individual compounds of Formula 1 may be mixed according to conventional means. Alternatively, it is also possible to obtain the mixture as a reaction product, by suitable selection of reaction conditions. Among such mixtures as above, a particularly valuable mixture is one obtained by condensing stilbene-4,4'-dicarboxylic acid with 2 mol ratio in total, based on said acid, of 2 or 3 compounds represented by the general formula

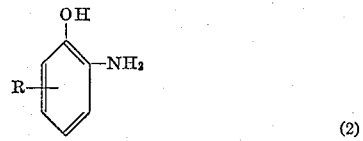
(2)

wherein R is a member selected from the group consisting of hydrogen atoms and alkyl groups having 1 to 4 carbon atoms.

When the two o-aminophenols employed are compounds of the formulas

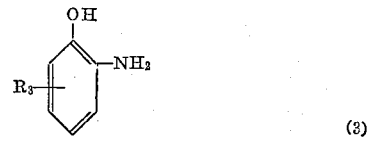
(3)

and

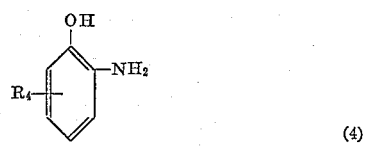
(4)

wherein $R_3$ and $R_4$ correspond to the definition of R of the general Formula 2 and are different from each other, it is presumed that the reaction product is a mixture of three compounds represented by the general formulas

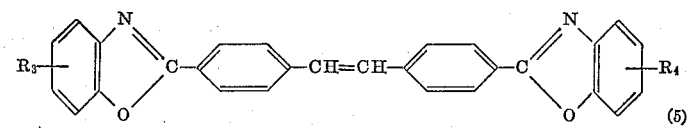
(5)

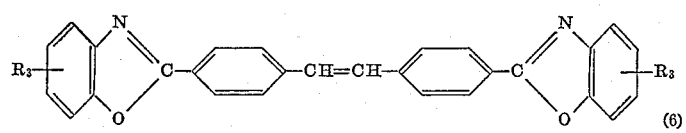
(6)

and

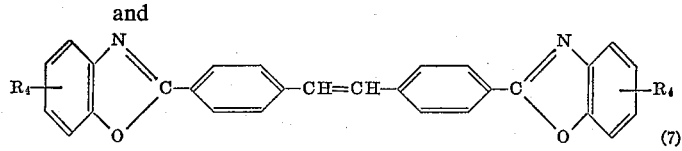
(7)

wherein $R_3$ and $R_4$ are as defined above.

In the above case, the proportion of the two o-aminophenols is particularly preferable when one of them is used in an amount of 40–60 mol percent. When the two o-aminophenols are used at a molar ratio of 50:50, it is expected, theoretically, that the resulting product comprises 50 mol percent of the compound of the Formula 5 and each 25 mol percent of the compounds of the Formulas 6 and 7. Further, in view of the paper chromatography of the product, it is also inferred that the product has substantially the same composition as mentioned above.

In case a mixture comprising three o-aminophenols is condensed with stilbene-4,4'-dicarboxylic acid, there is produced a mixture of 6 compounds.

Each of the mixtures obtained in the above manners is directly usable as a valuable optical brightening agent, but may be used in admixture with other optical brightening agents.

A thus obtained mixture of compounds represented by the general Formula 1 is valuable as an optical brightening agent for plastics comprising, for example, polyolefins, polyesters or polyamides, and for synthetic fibers comprising, for example, polyvinyl alcohols, polyesters or polyamides. The mixture is particularly excellent in that it gives to polyolefin fibers a prominent brightening effect favorable in light fastness, and a markedly high degree of whiteness is obtainable as compared with the case where a compound of the general Formula 1 is employed singly.

Further, it is worthy of special mention that the mixtures of the present invention have a markedly excellent brightening effect on propylene fibers containing polyvalent metal compounds, i.e., metal-modified polypropylene fibers. Such metal includes Ni, Mg, Al, Ca, Ti, Zr, Sn and Zn.

The mixture of compounds represented by the Formula 1, in accordance with the present invention, is advantageously employed in an aqueous bath in a finely dispersed state in the presence of dispersing agents. For the treatment of polyolefin fibers in such an aqueous dispersion, any ordinary dyeing process, carrier dyeing process, high temperature dyeing process and thermosol dyeing process may be adopted. In the treatment of fibers from the aqueous dispersion bath, the mixture of compounds of the Formula 1 is advantageously employed in an amount of from about 0.005% to 0.5% based on the weight of the fibers. It is also possible to dissolve or incorporate the mixture in a spinning solution before the spinning of polyolefin fibers.

The present invention will be more fully illustrated according to the following examples, in which all the parts and percentages are by weight.

*Example 1*

One part in total of a compound represented by the structural formula

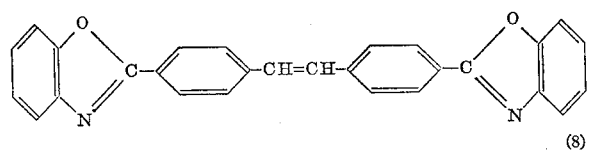

(8)

and a compound represented by the structural formula

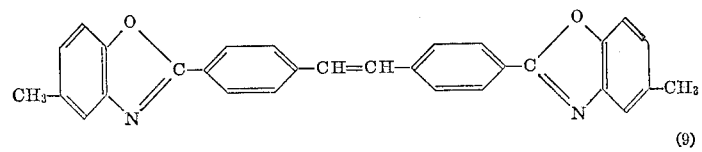

(9)

were dissolved at below 35° C. in 50 parts of 98.5% sulfuric acid at proportions set forth in Table 1 shown below. The solution was poured as a thin stream into 250 parts of water, while stirring vigorously. The resulting precipitate was filtered, neutralized and washed with water to obtain a wet cake. The wet cake thus obtained was thoroughly kneaded by means of a kneader together with 0.1 part of sodium dodecylbenzenesulfonate and 1 part of an addition product of about 25 mols of ethylene oxide and 1 mol of nonylphenol. To the resultant, water was added to form 20 parts of a homogeneously and finely dispersed paste.

100 parts of a taffeta cloth composed of polypropylene fibre was treated at 95°–100° C. for 60 minutes at a bath ratio of 1:30 in a bath containing 1 part of the above-mentioned paste and 3 g., per liter, of the aforesaid addition product of ethylene oxide and nonylphenol, and the treated cloth was then washed with water and dried. The thus treated cloth was visually judged to measure the relative whiteness and specific fluorescence strength thereof. The results are shown in Table 1.

TABLE 1

| No. | Mixing proportion of (8):(9) | Total amount employed (base on fiber), percent | Visual relative whiteness | Specific fluorescence strength | |
|---|---|---|---|---|---|
| | | | | Measured wave length, mμ | Relative strength |
| 1 | 100:0 | 0.05 | 40 | 434 | 66 |
| 2 | 90:10 | .05 | 60 | 435 | 84 |
| 3 | 80:20 | .05 | 80 | 435 | 91 |
| 4 | 70:30 | .05 | 100 | 435 | 100 |
| 5 | 60:40 | .05 | 90 | 435 | 95 |
| 6 | 50:50 | .05 | 70 | 435 | 85 |
| 7 | 30:70 | .05 | 50 | 436 | 70 |
| 8 | 0:100 | .05 | 40 | 437 | 55 |

NOTE: The visual relative whiteness is a measured value attained by visual observation of the cloth under the light entering through a window opened to the north, avoiding direct rays of the sun. The visual relative whiteness and the relative fluorescent strength are relative values measured by assuming as 100 the respective values of No. 4 mixture which gave the maximum values. The specific fluorescence strength is a measured value of the fluorescent strength of the cloth when irradiated with ultraviolet rays of about 365 mμ by use of a high pressure mercury vapour lamp, and the fluorescence strength of untreated cloth at about 435 mμ is 0. The measured wave length is λ max. of fluorescence spectrum. The relationship between the visual relative whiteness and the specific fluorescence strength will be explained in Table 3 of Example 9.

From the data of Nos. 1 to 8, it is recognized that the mixtures in accordance with the present invention give more excellent brightening effects than the cases of Nos. 1 and 8 in which each component of the mixture was used independently. Particularly excellent results were observed when the mixing proportion of the compound of the Formula 9 was 20–40% (Nos. 3 to 5).

The compounds of the Formulas 8 and 9 used in this example can be prepared in the following manners.

Compound of the Formula 8:

13.4 parts of stilbene-4,4'-dicarboxylic acid and 6.0 parts of phosphorus trichloride are stirred in trifluorobenzene at 80° C. for 30 minutes. To the mixture, 11.4 parts of 1-amino-2-hydroxybenzene is added and the resulting mixture is stirred at 100°–110° C. for 2 hours. Thereafter, the mixture is elevated in temperature to 205°–210° C., and is stirred at said temperature for additional 6 hours. After the completion of reaction, the mixture is cooled, and 200 parts of methanol is added thereto. The mixture is then stirred and the resulting precipitate is filtered and washed with methanol to obtain a press cake. The press cake thus obtained is suspended in 500 parts of a 3% aqueous potassium hydroxide solution, and the suspension is stirred at 90° C. for 30 minutes, and the resulting precipitate is filtered while hot. The precipitate is washed with hot water and is dried. The dried substance is recrystallized from O-dichlorobenzene to obtain the compound of the Formula 8 as slightly reddish, light yellow crystals melting at 347°–350° C. (not corrected).

Compound of the Formula 9:

The above operations are repeated, using 12.9 parts of 1-amino-2-hydroxy-5-methylbenzene in place of the 1-amino-2-hydroxybenzene to obtain the compound of the Formula 9 as light yellow crystals melting at 318°–321° C. (not corrected).

Example 2

13.4 parts of stilbene-4,4'-dicarboxylic acid and 6.0 parts of phosphorus trichloride were stirred in 150 parts of trichlorobenzene at 70°–80° C. for one hour. To the resultant was added a mixture of 6.5 parts of 1-amino-2-hydroxy-5-methylbenzene and 8.6 parts of 1-amino-2-hydroxy-5-tert. butylbenzene, and the resulting mixture was heated and reacted at 100°–110° C. for 2 hours, and then was boiled for additional 6 hours under reflux. After cooling the reaction mixture, 200 parts of methanol was added thereto and the resulting mixture was stirred and filtered. The residue was washed with methanol to obtain a press cake. The press cake thus obtained was suspended in 500 parts of a 3% aqueous potassium hydroxide solution. Thereafter, the suspension was stirred at 70°–80° C. for 30 minutes and the resulting precipitate was filtered while hot. The precipitate was washed with water and was then dried to obtain as yellowish crystals a mixture of three compounds represented, respectively, by the structural formulas

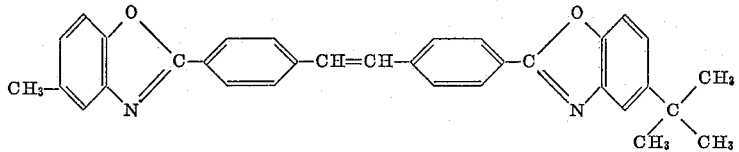

(10)

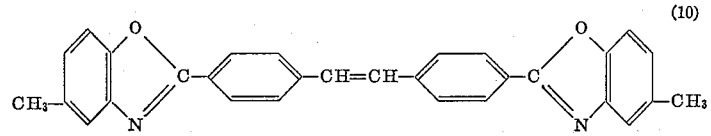

[same as the Formula 9]

and

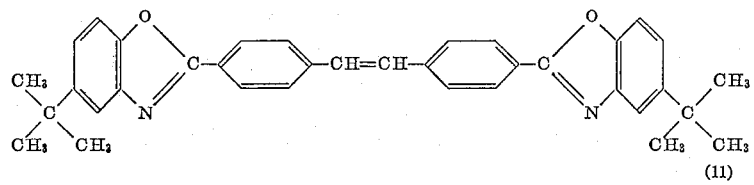

(11)

The infrared absorption spectrum of the product showed no characteristic absorption derived from carboxyl groups (>C=O).

The paper chromatogram of the product showed 3 spots, among which 2 spots were recognized to be identical with those of the compounds of the Formulas 9 and 11.

The product thus obtained is directly usable as a valuable optical brightening agent without any further purification.

Example 3

13.4 parts of stilbene-4,4'-dicarboxylic acid, 6.0 parts of phosphorus trichloride, 5.7 parts of 1-amino-2-hydroxybenzene and 6.5 parts of 1-amino-2-hydroxy-5-methylbenzene were stirred in 150 parts of trichlorobenzene for 30 minutes. The mixture was heated and reacted at 110°–120° C. for 2 hours and then was boiled for additional 5 hours under reflux. After cooling the reaction mixture, 200 parts of methanol was added thereto. The mixture was stirred and the resulting precipitate was filtered and washed with methanol to obtain a press cake. The press cake thus obtained was suspended in 500 parts of a 3% aqueous potassium hydroxide solution. After stirring at 70°–80° C. for 30 minutes, the suspension was filtered while hot and the resulting precipitate was washed with hot water to obtain as yellowish crystals a mixture of 3 compounds represented, respectively, by the structural formulas

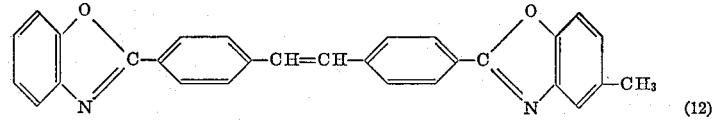

(12)

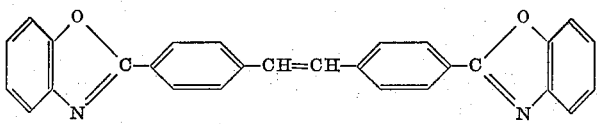

[same as Formula 8]

and

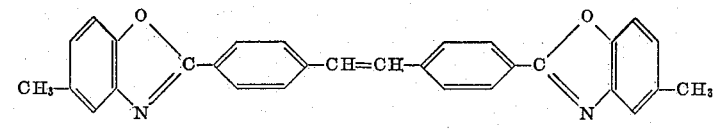

[same as the Formula 9]

The mixture thus obtained is also usable directly as a valuable optical brightening agent without any further purification.

*Example 4*

The same operations as in Example 3 were repeated, using the 1-amino-2-hydroxybenzene and 1-amino-2-hydroxy-5-methylbenzene in amounts of 6.9 parts and 5.2 parts, respectively, to obtain a mixture of 3 compounds represented by the Formulas 12, 8 and 9, respectively.

After cooling the mixture, 200 parts of methanol was added thereto and the resulting precipitate was filtered and was then washed with methanol to obtain a press cake. The press cake was suspended in 500 parts of a 3% aqueous potassium hydroxide solution, and the suspension was stirred at 80°–90° C. and the resulting precipitate was filtered while hot. The precipitate was washed with hot water and dried to form a somewhat greenish, light yellow crystals a mixture of 3 compounds represented by the structural formulas

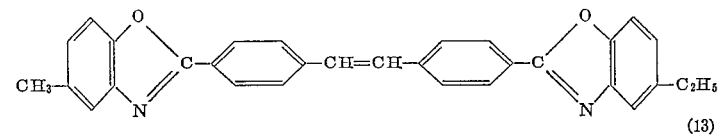
(13)

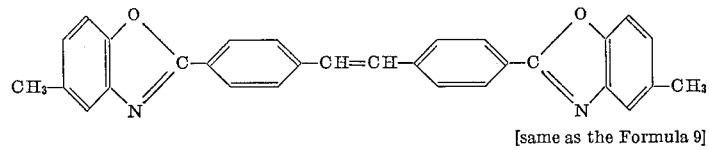
[same as the Formula 9]

and

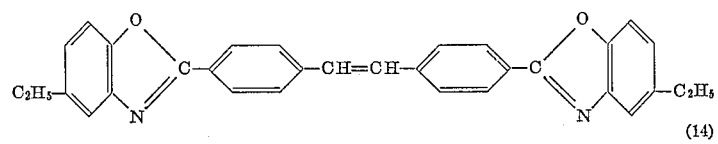
(14)

The mixing proportion of the compounds is inferred theoretically to be 48 mol percent, 36 mol percent and 16 mol percent, respectively.

*Example 5*

The same operations as in Example 3 were repeated, using the 1-amino-2-hydroxybenzene and 1-amino-2-hydroxy-5-methylbenzene in amounts of 4.6 parts and 8.1 parts, respectively, to obtain a mixture of 3 compounds represented by the general Formulas 12, 8 and 9. The mixing proportion of the compounds is presumed theoretically to be 48 mol percent, 16 mol percent and 36 mol percent, respectively.

*Example 6*

13.4 parts of stilbene-4,4'-dicarboxylic acid, 6.0 parts of phosphorus trichloride, 6.5 parts of 1-amino-2-hydroxy-5-methylbenzene and 7.2 parts of 1-amino-2-hydroxy-5-ethylbenzene were stirred in 150 parts of trichlorobenzene for 30 minutes. The resulting mixture was stirred, while introducing a nitrogen gas therein, at 90°–100° C. for 2 hours, and then at 190°–200° C. for additional 6 hours.

*Example 7*

15.3 parts of stilbene-4,4'-dicarboxylic acid dichloride, 7.2 parts of 1-amino-2-hydroxy-5-ethylbenzene and 8.7 parts of 1-amino-2-hydroxy-5-tert. butylbenzene were stirred in 150 parts of chlorobenzene for 30 minutes. The mixture was further stirred at 120°–130° C. for 5 hours, while introducing a nitrogen gas. After cooling the mixture, a yellow precipitate formed was filtered, washed with methanol and dried. The resulting product was a mixture of 3 compounds represented, respectively, by the structural formulas

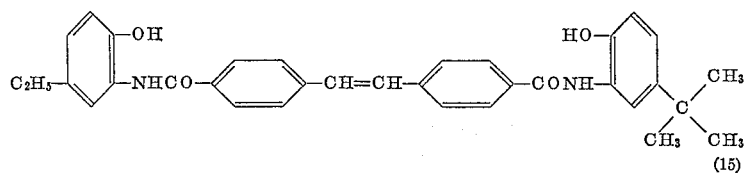
(15)

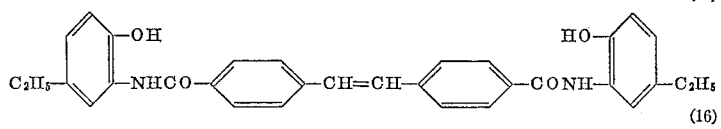
(16)

and

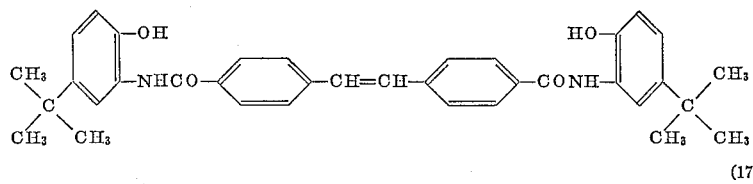
(17)

The above product was stirred at 205°–210° C. for 15 hours in 200 parts of trichlorobenzene, while introducing a nitrogen gas. Water formed during the above period was distilled together with the solvent out of the reaction system, and the solvent free from water was again returned back to the reaction system. After the completion of reaction, the reaction product was cooled and 300 parts of methanol was added thereto. The resulting precipitate was filtered and washed with methanol to obtain a press cake. The press cake was suspended in 50 parts of a 3% aqueous potassium hydroxide solution and the suspension was stirred at 90°–100° C. for one hour, whereby a precipitate was formed. The precipitate was washed with hot water and methanol to obtain, as somewhat greenish light yellow crystals, a mixture of 3 compounds represented, respectively, by the structural formulas

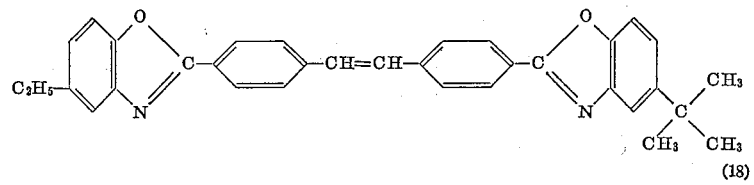

[same as the Formula 14]

and

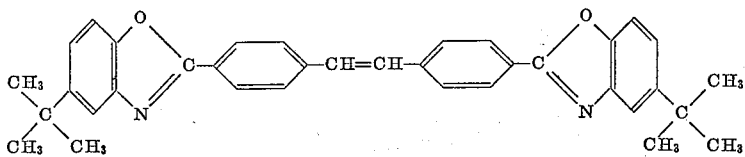

[same as the Formula 11]

*Example 8*

13.4 parts of stilbene-4,4'-dicarboxylic acid, 6.0 parts of phosphorus trichloride, 3.8 parts of 1-amino-2-hydroxybenzene, 4.3 parts of 1-amino-2-hydroxy-5-methylbenzene and 5.8 parts of 1-amino-2-hydroxy-5-tert. butylbenzene were stirred in 150 parts of trichlorobenzene for 30 minutes. Thereafter, the mixture was heated at 110°–120° C. for 2 hours and then was boiled for 5 hours under reflux. After the completion of reaction, the reaction product was treated in the same manner as in Example 2 to obtain as yellowish crystals a mixture of the following 6 compounds:

4 - (benzoxazolyl) - 4'-(5-methylbenzozazolyl)-stilbene (12)
4-(benzoxazolyl)-4'-(5-tert. butyl benzoxazolyl)-stilbene (19)
4-(5-methylbenzoxazolyl)-4'-(5-tert. butyl benzoxazolyl)-stilbene(10)
4,4'-bis-(benzoxazolyl)-stilbene(8)
4,4'-bis-(5-methylbenzoxazolyl)-stilbene(9)
4,4'-bis-(5-tert. butylbenzoxazolyl)-stilbene(11)

The product thus obtained is also usable directly as a valuable optical brightening agent.

*Example 9*

One part of the mixture obtained according to the process set forth in Example 3 which comprises 3 compounds represented, respectively, by the structural formulas

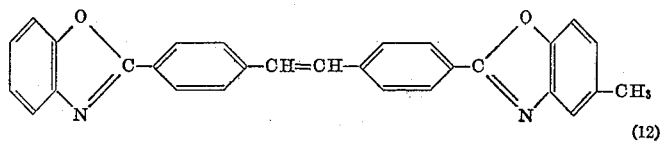

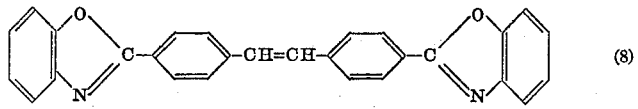

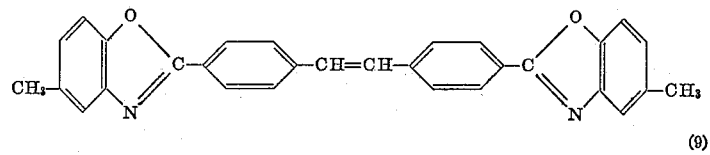

was dissolved at below 30° C. in 30 parts of 98.5% of sulfuric acid. The solution was poured as a thin stream into 150 parts of water under vigorous agitation. The resulting precipitate was filtered, neutralized and washed with water to obtain a wet cake. The wet cake was thoroughly kneaded by means of a kneader together with 0.1 part of sodium dodecylbenzenesulfonate and 1 part of an addition product of about 25 mols of ethylene oxide and 1 mol of nonylphenol. To the resultant, water was added to form 20 parts of a homogeneously and finely dispersed paste.

100 parts of a taffeta cloth composed of polypropylene fibre was treated at 95°–100° C. for 60 minutes at a bath ratio of 1:30 in a bath containing 1 part of the above-mentioned paste and 3 g. per liter, of the aforesaid addition product of ethylene oxide and nonylphenol, and the treated cloth was then washed with water and dried. The thus treated cloth was visually judged to measure the whiteness and specific fluorescence strength thereof.

The same measurements were separately effected on a cloth treated according to the same operations as in this example, using independently 1 part of respective compounds of the Formulas 8, 9 and 12.

The data obtained are shown in Table 2.

TABLE 2

| No. | Brightening agent | Amount used (based on fiber), percent | Visual relative whiteness | Specific fluorescence strength | |
|---|---|---|---|---|---|
| | | | | Measured wave length, mμ | Relative strength |
| 9 | Mixture of this example | 0.5 | 140 | 435 | 110 |
| 10 | Compound of Formula 12 | .05 | 60 | 435 | 78 |
| 11 | Compound of Formula 8 | .05 | 40 | 434 | 67 |
| 12 | Compound of Formula 9 | .05 | 40 | 437 | 55 |

NOTE: It is known that, when the fluorescence strength of a fiber observed under ultraviolet rays by use of a high pressure mercury vapour lamp is high, the whiteness of the fiber observed with the naked eye is also high, in most cases, but the two are not necessarily in a lineally proportional relationship.

It is recognized that the mixture in accordance with the present invention gives markedly excellent brightening effects as compared with the case where each component is used independently.

The compound of the Formula 12 cited in this example was separated from the product obtained in Example 3 by repeating the recrystallization from an organic solvent and the operation by chromatography. It melts at 310°–315° C. (not corrected).

In the case of the present mixtures, the above relationship is as shown in Table 3.

TABLE 3

| No. | Brightening agent | Amount used (based on fiber), percent | Visual relative whiteness | Specific fluorescence strength (measured at 435 mμ) |
|---|---|---|---|---|
| 13 | Mixture of this example | 0.012 | 40 | 65 |
| 14 | do | .025 | 80 | 93 |
| 15 | do | .05 | 140 | 101 |
| 16 | do | .10 | 190 | 116 |
| 17 | do | .20 | 210 | 117 |

*Example 10*

One part of the mixture obtained in Example 2 which comprises 3 compounds of the structural formulas

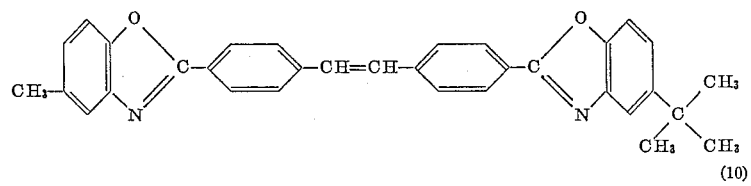

(10)

(9)

and (11)

was treated in the same manner as in Example 8 to form 20 parts of a paste.

100 parts of a taffeta cloth composed of polypropylene fibre was treated at 95°–100° C. for 60 minutes at a bath ratio of 1:30 in a bath containing 1 part of said paste and 3 g., per liter, of the aforesaid addition product of ethylene oxide and nonylphenol, and the treated taffeta cloth was then washed with water and dried. The thus treated cloth was visually judged to measure the whiteness and relative fluorescence strength thereof, in the same manners as in Example 1.

The same measurements were separately effected on a cloth treated according to the same operations as in this example, using 1 part of respective compounds of the Formulas 10, 9 and 11, independently. The data obtained are shown in Table 4.

TABLE 4

| No. | Brightening agent | Amount used (based on fiber), percent | Visual relative whiteness | Specific fluorescence strength | |
|---|---|---|---|---|---|
| | | | | Measured wave length, mμ | Relative strength |
| 18 | Mixture of this example | 0.05 | 140 | 437 | 110 |
| 19 | Compound of Formula 10 | .05 | 50 | 437 | 69 |
| 20 | Compound of Formula 9 | .05 | 40 | 437 | 55 |
| 21 | Compound of Formula 11 | .05 | 40 | 437 | 58 |

As is clear from the above table, the mixture of the present invention gives markedly excellent brightening effect as compared with the case where each component is employed singly.

In this example, substantially the same brightening effect is attained when the treatment is conducted by incorporating in the treating bath 6 g., per liter, of a chlorobenzene carrier.

Example 11

20 parts of a paste was prepared by repeating the same procedures as in Example 9, using one part of the mixture of 6 compounds represented by the structural Formulas 12, 19, 10, 8, 9 and 11 which was obtained in Example 8. One part of the paste was used to treat 100 parts of a cloth composed of polypropylene fiber in the same manner as in Example 9. The treated cloth was visually measured in relative whiteness and specific fluorescence strength according to Example 1 to obtain the following values:

Visual relative whiteness: 120

Specific fluorescence strength measured at 436 mμ: 105

These values are relative values obtained by assuming the measured values of No. 4 in Table 1 of Example 1 as 100, like in the case of Examples 9 and 10.

Example 12

One part of the mixture employed in Example 9 was subjected to the same treatment as in Example 9 to obtain 20 parts of a paste. Using 1 part of the paste, 100 parts of a taffeta cloth composed of polypropylene fibre containing 5% of aluminum stearate was treated in the same manner as in Example 9. The treated cloth was measured in its visual whiteness and specific fluorescence strength, in Example 1.

The specific fluorescence strength of the treated cloth was 120 when measured at 436 mμ, though the modified polypropylene cloth used in this example was not substantially identical with, and hence could not be strictly compared in specific fluorescence strength with, the natural polypropylene cloth employed in each of Examples 1, 9, 10 and 11. The visual relative whiteness of the treated cloth was considerably higher than the case where No. 9 mixture of Table 2 in Example 9 was used, though the numerical indication thereof was difficult due to the difference in the quality of cloth.

What we claim is:

1. An optical brightening agent for polyolefin fibers consisting of a mixture of substantial brightening amounts of each of two to six compounds, differing each from the other having the general formula:

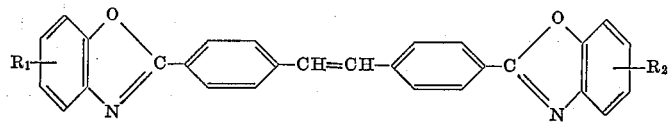

wherein each of $R_1$ and $R_2$ is a member selected from the group consisting of a hydrogen atom, methyl, ethyl, propyl and butyl groups and wherein said mixture of compounds produces a brightening effect that is greater than that produced by a corresponding amount of one of said compounds.

2. An optical brightening agent for polyolefin fibers which consists essentially of a mixture of substantial brightening amounts of each of 3 compounds represented, respectively, by the formulas

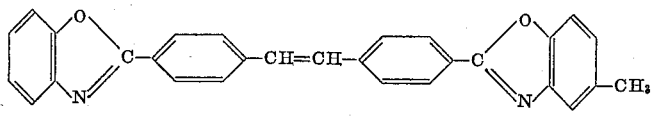

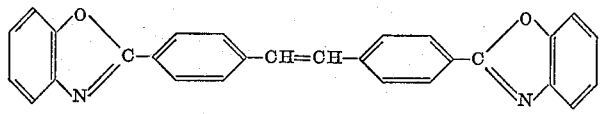

and

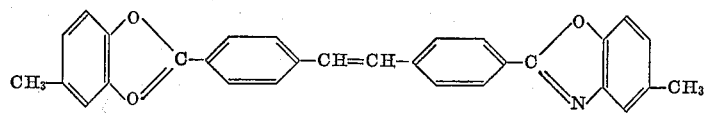

and wherein said mixture of compounds produces a brightening effect that is greater than that produced by a corresponding amount of one of said compounds.

3. An optical brightening agent for polyolefin fibers which consists essentially of a mixture of substantial brightening amounts of each of 3 compounds represented, respectively, by the formulas

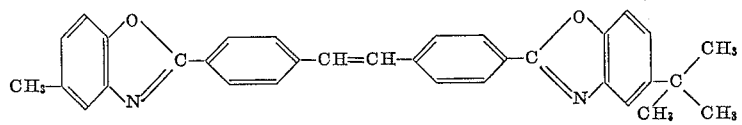
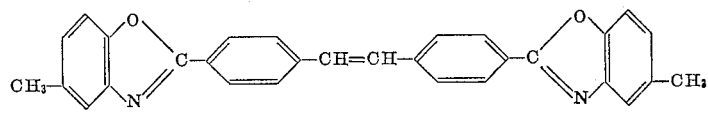
and
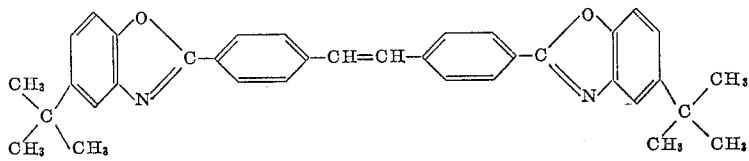

and wherein said mixture of compounds produces a brightening effect that is greater than that produced by a corresponding amount of one of said compounds.

4. An optical brightening agent for polyolefin fibers which consists essentially of a mixture of substantial brightening amounts of each of 3 compounds represented, respectively, by the formulas

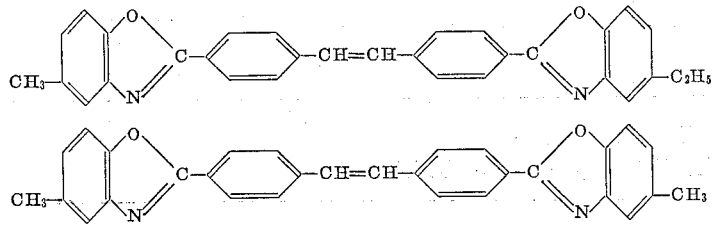
and
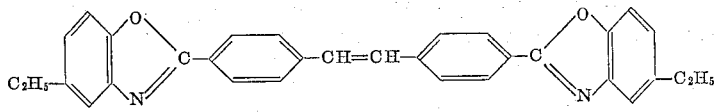

and wherein said mixture of compounds produces a brightening effect that is greater than that produced by a corresponding amount of one of said compounds.

5. An optical brightening agent for polyolefin fibers which consists essentially of a mixture of substantial brightening amounts of each of 2 compounds represented, respectively, by the formulas

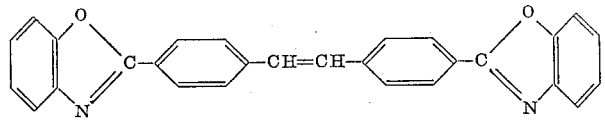
and
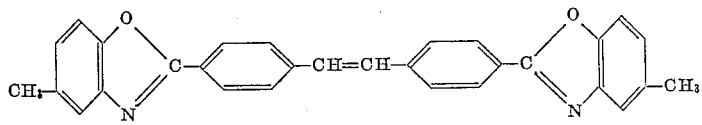

and wherein said mixture of compounds produces a brightening effect that is greater than that produced by a corresponding amount of one of said compounds.

6. An optical brightening agent for polyolefin fibers according to claim 5, wherein the amount of the compound represented by the formula

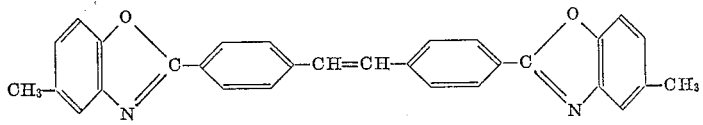

is 20–40% based on the total amount of oxazole compounds.

(References on following page)

References Cited

UNITED STATES PATENTS 3,132,106   5/1964   Villaume _____ 252—301.2

FOREIGN PATENTS 648,674   1/1964   Belgium.

TOBIAS E. LEVOW, *Primary Examiner.*
ROBERT D. EDMONDS, *Examiner.*